May 9, 1950     F. L. TOWNSEND     2,507,126
DISK TYPE FILTER UNIT
Filed July 6, 1946
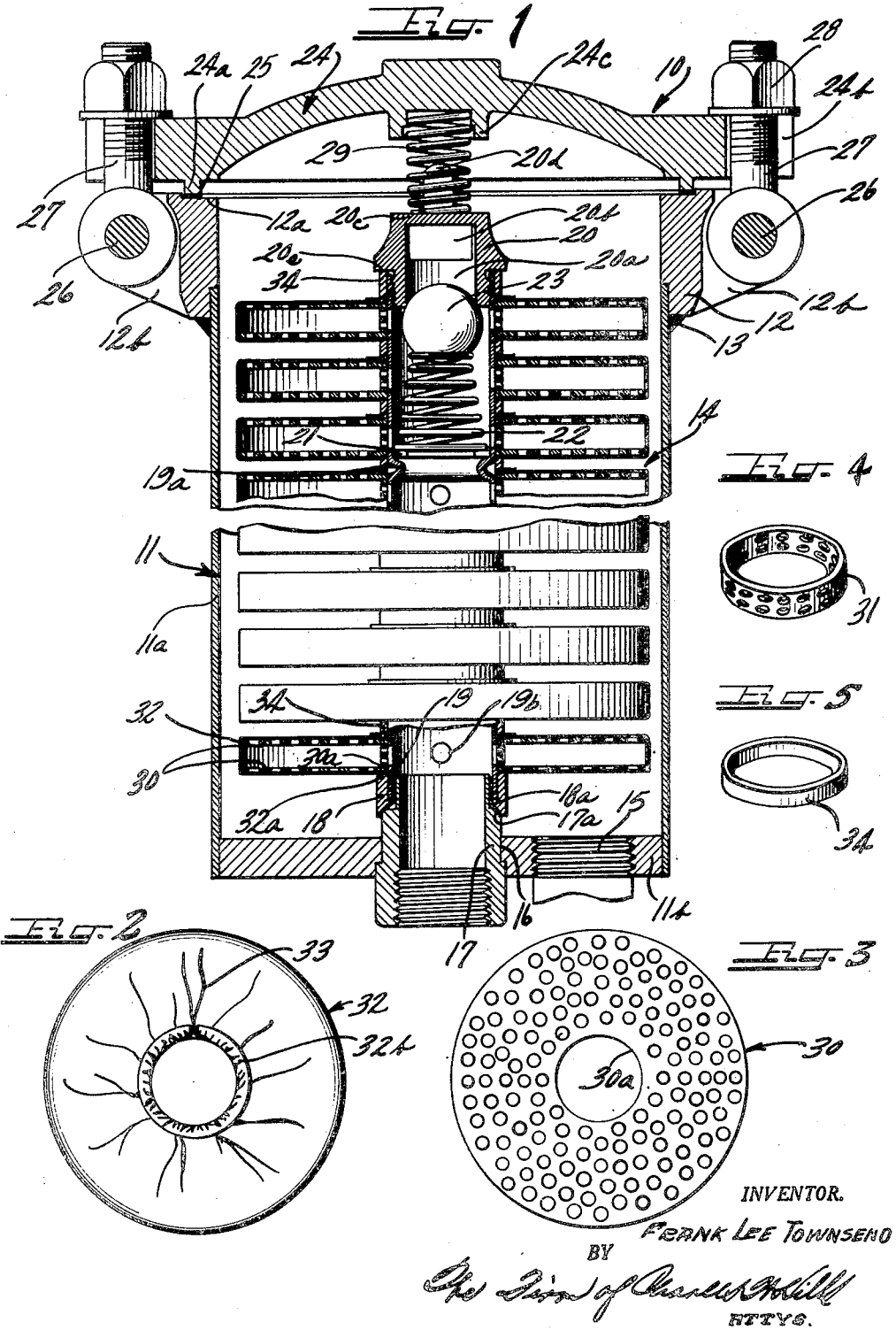
INVENTOR.
FRANK LEE TOWNSEND Patented May 9, 1950

2,507,126

UNITED STATES PATENT OFFICE 2,507,126

DISK TYPE FILTER UNIT

Frank Lee Townsend, Chicago, Ill.

Application July 6, 1946, Serial No. 681,643

6 Claims. (Cl. 210—181)

This invention relates to a filter device composed of a stack of perforated disks arranged in paired opposed relation on a perforated tube or pipe and having filter bags therearound for filtering fluids into the perforated tube. More specifically this invention deals with an inexpensive high capacity filter device composed of a tank, a perforated pipe, a plurality of perforated disks seated on the pipe and extending radially therefrom, alternately arranged perforate and imperforate rings seated on the pipe to hold the disks in opposed paired relationship, and cloth filter bags surrounding opposed pairs of disks to filter fluids through the perforated rings into the pipe and out of the tank.

The filter device of this invention is inexpensive and readily serviced. Thus the device includes a relatively inexpensive can-like housing or container with an open top closed by a removable lid and a bottom having inlet and outlet bosses. A perforated pipe is removably seated on the outlet boss and extends through the central portion of the container. This pipe supports flat perforated disks which extend radially from the pipe and are held in spaced relation by rings that are seated on the pipe. Alternate rings are perforated and aligned with perforations in the pipe. These perforated rings separate two disks. A cloth bag or the like filter cover surrounds both disks separated by the perforated ring. This bag is drawn into snug engagement with the pipe by means of a draw string or the like. The imperforate rings separate the pairs of bag enclosed disks so that each bag is fully exposed in the container around its top and bottom faces as well as around its periphery. The thus exposed bags provide extended filter surfaces which materially increase the capacity of the device without increasing the size of the container. The pipe, with all of the disks, bags and rings thereon can be removed as a unit through the open top of the container. An entire new assembly can be inserted in the container so that the filtering operation can be continued without delay. The disks, rings and bags are readily removed from the pipe for cleaning or replacement as needed.

It is then an object of this invention to provide a high capacity inexpensive filter unit that can be quickly serviced.

A further object of the invention is to provide a filter device composed of a series of filter units on an upstanding pipe with each unit including spaced opposed disks covered by a filter bag.

A still further object of the invention is to provide a filter unit composed of radially extending disks on a discharge tube wherein adjacent disks are covered with a filter bag.

Another object of the invention is to provide a filter unit composed of a stack of spaced disks arranged in paired relationship and having replaceable covers which can be quickly removed and replaced.

Other and further objects of this invention will be apparent to those skilled in the art from the following detailed description of the annexed sheet of drawings which, by way of a preferred example only, illustrates one embodiment of the invention.

On the drawings:

Figure 1 is a broken vertical cross sectional view, with parts in elevation, of a disk type filter device according to this invention.

Figure 2 is a top plan view of a filter bag used in the device of this invention.

Figure 3 is a plan view of one of the perforated disks used in the device of this invention.

Figure 4 is an isometric view of one of the perforated spacer rings used in the device of this invention.

Figure 5 is an isometric view of one of the imperforate spacer rings used in the device of this invention.

As shown on the drawings:

In Fig. 1, the reference numeral 10 designates generally the filter device of this invention. The device 10 includes a cylindrical can type container 11 with a cylindrical side wall 11a, a flat thick bottom wall 11b and a heavy ring 12 around the open top thereof and secured to the side wall 11a by means of a welded bond 13. The container 11 defines a filter chamber 14 adapted to receive fluids to be filtered through an inlet opening 15 in the bottom 14. An outlet opening 16 is also provided in the bottom 14. This opening 16 receives a nipple or pipe stub 17. The nipple 17 has a shoulder 17a in the chamber 14 in closely spaced relation above the bottom 11b.

A collar or head member 18 surrounds the nipple 17 and is seated on the shoulder 17a. This collar 18 in turn receives a perforated pipe 19. The pipe is integrally affixed in the collar 18 as by welding, brazing or the like and terminates on a shoulder 18a provided in the collar.

The pipe 19 extends through the central portion of the chamber 14 to a level adjacent the open top of the container. A ported cap 20 is threaded into the top end of the pipe 19. This cap has an axial passage 20a with side ports 20b and a top wall 20c with a lug 20d projecting upwardly from the central portion thereof.

The pipe 19 has an inwardly pinched portion 19a spaced from the top thereof providing an internal bead on which is bottomed a ring 21. A coil spring 22 is seated on the ring and extends upwardly therefrom to receive in the upper end coil thereof a ball member 23. This ball member 23 is held by the spring against the cap 20 to close the passageway 20a.

A cover or lid 24 is provided for the open top of the container 11. This lid seats on top of the ring 12 and preferably has a depending rib 24a bottomed on a gasket 25 carried in a recess 12a around the top end edge of the ring 12. Several pairs of ears 12b are provided on the periphery of the ring 12 and carry pins 26 on which are swivelly mounted swing bolts 27. The swing bolts 27 fit into slots 24b in the periphery of the lid and nuts 28 threaded on the bolts 27 clamp the lid 24 tightly on the top of the container to seal the chamber 14.

The lid has a depending hollow lug 24c in the central portion thereof providing a chamber receiving the upper end coil of a second coiled spring 29. The lower end coils of this spring surround the lug 20d and the spring is bottomed on the shoulder 20c of the cap to urge the collar 18 carried by the lower end of the pipe 19 into tightly seated and sealed engagement with the shoulder 17a of the nipple 17.

A plurality of perforated disks 30 composed of metal, plastic, wood, or other rigid material, are snugly seated on the tube 19 and have central apertures 30a receiving the tube therethrough. The bottom disk 30 is bottomed on the top end of the collar 18.

The disks 30 are held in spaced opposed paired relationship on the tube by means of perforated rings 31. These rings are composed of metal, plastic, or other rigid material and have the perforations thereof aligned with apertures 19b in the tube.

Each pair of disks 30 receives a filter bag 32 therearound. The filter bag is composed of cloth, paper, or other flexible filter material. In some instances asbestos fabric may be used. Each bag 30 has a bottom aperture 32a snugly receiving the tube 19 therethrough. The periphery of the bag has a draw string hem 32b therearound with a draw string 33 slidable therethrough. As shown in Fig. 1 the bottom bag 32 is seated on the upper end of the collar 18 and snugly receives the pipe or tube 19 through its bottom aperture 30a. The bag then extends radially outward under the bottom disk 30 and thence axially upward across the space between the pair of disks 30. The draw string has been tightened to pull the hem 32b tightly around the tube 19 thereby covering the top surface of the second disk 30.

Imperforate rigid rings 34 are provided to separate the bags in axially spaced relation along the length of the tube 19. These imperforate rings 34 are composed of metal, plastic, wood, or other rigid material, and snugly receive the tube therethrough. As shown in Fig. 1 the hem 32b of each bag receives a spacer ring 34 thereon and this spacer ring holds the next bag in spaced relation from the bag on which it is bottomed.

A stack of bag filters each containing a pair of spaced opposed perforate disks is built up on the tube 19 from the disks, the bags, the perforate rings and the imperforate rings. The top imperforate ring 34 is acted on by a shoulder 20e on the bottom of the cap 20. The cap is threaded into the tube 19 to thrust on this top ring and coacts with the collar 18 to hold all of the bag filters in fixed relation on the tube. The filters are thus clamped between the top cap 20 and the bottom collar 18.

Fluid is introduced into the chamber 14 under pressure and is filtered through the bags 32 and through the perforations in the perforated disks and rings into the tube 19 for drainage through the nipple 17 out of the container. When it is desired to clean or replace the filter bags it is only necessary to remove the lid 24 and lift the tube with the disks, rings and filter bags thereon off of the nipple 19 and out of the container 11. A replacement pipe containing a stack of disk filters encased in filter bags is then inserted in the container on the nipple 17 and the lid is replaced. The device is then ready for immediate use. The removed tube can then have the cap 20 unscrewed therefrom to release all of the rings, disks and filter bags. New filter bags are readily placed on the disks to build up a new stack of filter units. The imperforate rings 34, in being bottomed on the draw string hems 32, prevent the draw strings from being subjected to substantial tension loads during the filtering operation since these spacer rings will clamp the hem against the inner peripheral portion of the disk to form a seal.

The disks can be of relatively thin gauge material but should be substantially rigid. The perforated rings can be of any desired height. Ring heights as small as $\frac{1}{16}$ of an inch can be used. The imperforate spacer rings need only be sufficiently high to hold the bags in spaced relation and thereby expose their faces for filtering.

From the above descriptions it will therefore be understood that this invention provides an inexpensive high capacity filter unit that can be quickly serviced and easily cleaned.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A filter device comprising a container having a closed bottom and an open top, said bottom having an inlet opening and a central aperture, a nipple secured in said central aperture of said bottom and extending into the container, a lid for the open top of said container, means for clamping said lid to the container, a perforated pipe supported on said nipple in said container, flat radial disks surrounding said pipe in snug relation thereon, alternate rigid perforated spacer rings and imperforate spacer rings on said pipe between said disks for supporting the disks in spaced parallel relation and for separating said disks into pairs, filter bags embracing each pair of disks and snugly receiving the pipe therethrough, means on said pipe clamping the disks, spacer rings and filter bags in assembled relation on the pipe, and spring means between said cover and the top of said pipe holding the pipe on said nipple whereby fluid introduced through said inlet is filtered through said bags into said pipe and out of said nipple.

2. A filter device comprising a container, a removable cover for said container, an inlet for said container, an upstanding outlet nipple having a shoulder in opposed relation to said removable cover, a perforated pipe bottomed on said shoulder, a ported cap on the opposite end of said pipe having an interior passage communicating with the interior of said pipe, a spring between said cover and said ported cap holding the pipe on the outlet nipple, a spring pressed relief valve in said pipe arranged to close said interior passage of the cap, superimposed perforated plates surrounding said pipe, alternate perforate and imperforate spaced rings positioned around said pipe between said plates to support the disks in spaced parallel position and to separate the disks into pairs, a filter bag surrounding each pair of parallel disks and the perforate spacer ring therebetween to define filtering units surrounding said pipe and having interior filter spaces communicating with the interior of said pipe, said inlet adapted to receive fluid therethrough to fill said container for filtering through said bag filter units and said pipe adapted to receive the filtered fluid for discharge out of the container through the outlet nipple, said spring pressed valve adapted to connect the interior of the container directly with the pipe and outlet nipple whenever pressure in the container increases beyond the spring load on the valve.

3. A filter device comprising a container having an upstanding tube stub in the bottom wall thereof, a collar mounted on said tube stub and having an interior shoulder and an upper shoulder, a perforated pipe bottomed on said interior shoulder and extending axially through said container, a ported outlet cap on the end of said pipe, a cover for said container, a spring compressed between said cover and said cap for holding the pipe on said interior shoulder, a by-pass valve controlling flow through the ported cap into the pipe, a filter bag bottomed on said upper shoulder of said collar, a perforated disk in said filter bag, a perforated ring on said pipe bottomed on said disk, a second disk bottomed on said perforated ring, a draw string in said filter bag drawing the bag over the second disk into tight engagement with said pipe, an imperforate spacer ring on said pipe bottomed on the draw string end of said bag, a plurality of identical filter units composed of perforated disks, perforated rings and filter bags separated by imperforate spacer rings built up in succesion on the first mentioned imperforate spacer ring, and said ported cap having a shoulder thrusting against the top spacer ring to hold the bag filter units in stacked relation on said pipe.

4. A filter device comprising a housing having an inlet opening and an outlet nipple in one end thereof, a removable lid for said housing, a perforated pipe seated on said nipple, spring means between said pipe and said lid holding the pipe on the nipple, a plurality of perforated disks having a central aperture therethrough receiving the tube in snug fitting relation, superimposed alternate perforate and imperforate cylindrical spacer rings between said disks for separating the disks into spaced pairs, a filter bag surrounding each pair of disks and the perforate spacer ring therebetween and snugly receiving the tube therethrough to define an interior filtrate chamber in fluid communication with said apertured tube, and means for securing said units to said tube.

5. A filter device comprising a container having an open top, a removable cover for said top, an upstanding tube stub in the bottom of said container providing an outlet passage, an inlet for said container, an apertured pipe removably seated on said tube stub and extending axially through said container into spaced relation from the open top thereof, a spring between said lid and the top end of said pipe holding the pipe on said tube stub, a plurality of perforated disks extending radially from said pipe, a plurality of alternate perforate and imperforate cylindrical rings surrounding said pipe and disposed between said disks to maintain the disks in spaced relation, the perforated rings having perforations aligned with perforations of the pipe, and said imperforate rings separating said disks into spaced pairs, a filter bag surrounding each pair of parallel disks with a perforate spacer ring therebetween and snugly receiving the tube therethrough to define an interior filtering chamber in direct communication with said tube through said perforated ring.

6. In a filtering device including an open-top container housing having inlet and outlet openings and a removable top closure, a filter assembly extending axially of the housing comprising a perforated pipe in registry with said outlet opening, a plurality of flat perforate disks centrally apertured to receive said pipe, alternate perforate and imperforate spacer rings interposed between adjacent discs to divide the same into pairs, a filter bag for enclosing each of said pairs of discs and the perforate ring therebetween to form cylindrical filter units establishing communication between said housing inlets and outlets through said pipe, and means on said pipe clamping the discs, spacer rings and filter bags in assembled relation on said pipe.

FRANK LEE TOWNSEND.

REFERENCES CITED

The following references are of record in the file of this patent:

UNITED STATES PATENTS

| Number | Name | Date |
|---|---|---|
| 969,224 | Turek | Sept. 6, 1910 |
| 1,836,308 | Bull | Dec. 15, 1931 |
| 2,088,199 | Gleason | July 27, 1937 |
| 2,352,732 | Nugent | July 4, 1944 |
| 2,382,594 | Wolcott | Aug. 14, 1945 |